(12) United States Patent
Williamson

(10) Patent No.: US 11,473,575 B2
(45) Date of Patent: Oct. 18, 2022

(54) DUAL DRIVE VANE PUMP

(71) Applicant: Hanon Systems EFP Canada Ltd., Concord (CA)

(72) Inventor: Matthew Williamson, Richmond Hill (CA)

(73) Assignee: Hanon Systems EFP Canada Ltd., Concord (CA)

( * ) Notice: Subject to any disclaimer, the term of this patent is extended or adjusted under 35 U.S.C. 154(b) by 278 days.

(21) Appl. No.: 16/874,768

(22) Filed: May 15, 2020

(65) Prior Publication Data

US 2021/0355941 A1    Nov. 18, 2021

(51) Int. Cl.
*F04C 14/22* (2006.01)
*F04C 2/344* (2006.01)
*F04C 15/06* (2006.01)

(52) U.S. Cl.
CPC .......... *F04C 14/226* (2013.01); *F04C 2/3442* (2013.01); *F04C 15/06* (2013.01); *F04C 2240/20* (2013.01); *F04C 2240/30* (2013.01); *F04C 2270/18* (2013.01)

(58) Field of Classification Search
CPC ...... F04C 14/226; F04C 2/3442; F04C 15/06; F04C 2240/20; F04C 2240/30; F04C 2270/18
See application file for complete search history.

(56) References Cited

U.S. PATENT DOCUMENTS

| | | | |
|---|---|---|---|
| 3,583,839 A | 6/1971 | Brundage | |
| 4,334,843 A * | 6/1982 | Hansen | F04C 2/103 418/61.3 |
| 4,561,834 A * | 12/1985 | Poss | F04C 13/001 418/150 |
| 4,737,090 A * | 4/1988 | Sakai | F04C 18/3441 418/150 |
| 9,797,501 B2 | 10/2017 | Bohm | |
| 10,072,660 B2 | 9/2018 | Bohm | |
| 10,815,991 B2 * | 10/2020 | Kowalski | F04C 15/0061 |
| 2011/0217192 A1 | 9/2011 | Rosalik, Jr. | |
| 2013/0336808 A1 | 12/2013 | Wang et al. | |
| 2017/0058895 A1 * | 3/2017 | Schultz | F04C 15/0073 |
| 2018/0066655 A1 | 3/2018 | Kowalski et al. | |
| 2020/0182241 A1 | 6/2020 | Pawellek et al. | |

* cited by examiner

*Primary Examiner* — Connor J Tremarche

(74) *Attorney, Agent, or Firm* — Harness, Dickey & Pierce, P.L.C.

(57) ABSTRACT

A fluid pumping system for a vehicle having an internal combustion engine comprises a housing, an electric motor, a rotatable first input adapted to be driven by the internal combustion engine, a rotatable second input driven by the electric motor, and a pump. The pump includes a drum selectively rotated about a drum axis of rotation by one of the first input and the second input, and a pump rotor selectively rotated by the other of the first input and the second input. The drum includes a cam ring having a cavity in receipt of the pump rotor. The drum includes a first fluid inlet port and a second fluid inlet port on opposite sides of the drum such that fluid entering the cavity through the first and second fluid ports flows axially in a direction parallel to the drum axis of rotation. The drum includes a radially extending outlet port such that pumped fluid flows radially out of the cavity. The housing contains the electric motor and the pump.

17 Claims, 5 Drawing Sheets

DUAL DRIVE VANE PUMP

FIELD

The present disclosure relates to a fluid pumping system for a vehicle. More particularly, the lubrication system includes an internal combustion engine as a first source of power and an electric motor as a second source of power.

BACKGROUND

Automotive vehicles are typically equipped with one or more pumps to transfer the fluid to various locations throughout the vehicle. Many vehicles in production today are equipped with at least one pump driven by an internal combustion engine of the vehicle. Examples of such pumps include fuel pumps, water pumps, internal combustion engine oil pumps, transmission oil pumps, superchargers, turbochargers, power steering pumps, air conditioning system compressors as well as fluid pumps that provide power to actuation systems for devices such as automatic transmissions, transfer cases, clutches and a host of other vehicle pumping requirements. While many of these pumps have operated satisfactorily in the past, a few concerns exist.

For example, many pumps are configured as fixed displacement pumps to minimize cost of the assembly. The fixed displacement pump is typically sized to provide a maximum flow rate or pressure based on a peak demand of the system. During much of the vehicle operation, however, peak pump output is not required. As such, the pump may be driven to provide a relatively high output, such as at a high engine operating speed, when a relatively low output is required. The energy associated with providing the higher pump output instead of the lower output may be viewed as energy waste.

Pumps driven solely by an electric motor may also be used within motor vehicle applications. A pump solely powered by an electric motor, however, typically does not provide the same efficiency of operation as a pump mechanically driven by the internal combustion engine. Accordingly, a need in the art may exist for a pump having two independent power sources to improve vehicle efficiency, provide simplified pump packaging and provide a variable output independent of internal combustion engine rotating speed. It may be particularly desirable to provide a dual input pump that does not include a planetary gearset as these power transmission devices are relatively expensive to manufacture and require relatively large packaging space.

SUMMARY

A fluid pumping system for a vehicle having an internal combustion engine comprises a housing, an electric motor, a rotatable first input adapted to be driven by the internal combustion engine, a rotatable second input driven by the electric motor, and a pump. The pump includes a drum selectively rotated about a drum axis of rotation by one of the first input and the second input, and a pump rotor selectively rotated by the other of the first input and the second input. The drum includes a cam ring having a cavity in receipt of the pump rotor. The drum includes a first fluid inlet port and a second fluid inlet port on opposite sides of the drum such that fluid entering the cavity through the first and second fluid ports flows axially in a direction parallel to the drum axis of rotation. The drum includes a radially extending outlet port such that pumped fluid flows radially out of the cavity. The housing contains the electric motor and the pump.

In accordance with another aspect of the present disclosure, a fluid pumping system for a vehicle having an internal combustion engine comprises a housing, an electric motor, a rotatable first input driven by the internal combustion engine, a rotatable second input driven by the electric motor, and a vane pump. The vane pump includes a rotatable cam ring having a cylindrical cavity, a rotatable pump rotor, and circumferentially spaced apart vanes. The vanes and the pump rotor are fixed for rotation with one another and positioned with the cylindrical cavity. The cam ring is drivingly coupled to one of the electric motor and the internal combustion engine. The pump rotor is drivingly coupled to the other of the electric motor and the internal combustion engine. The cam ring is supported for rotation within the housing.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
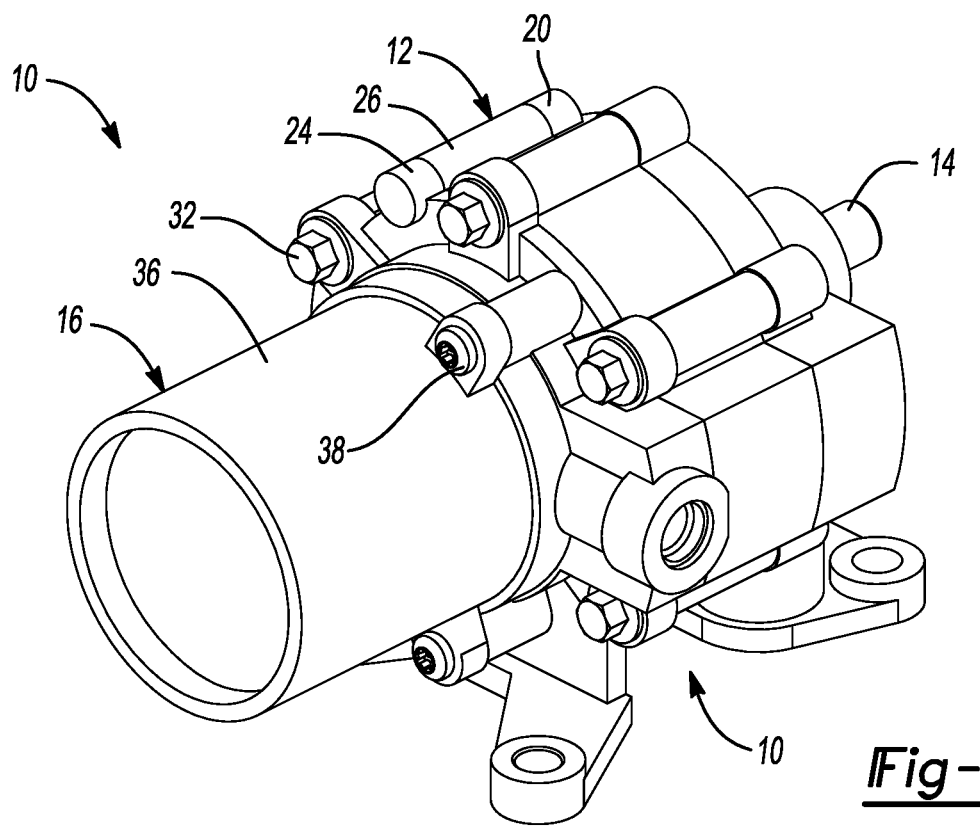
FIG. 1 is a perspective view of an exemplary pump constructed in accordance with the teachings of the present disclosure.
Figure 2:
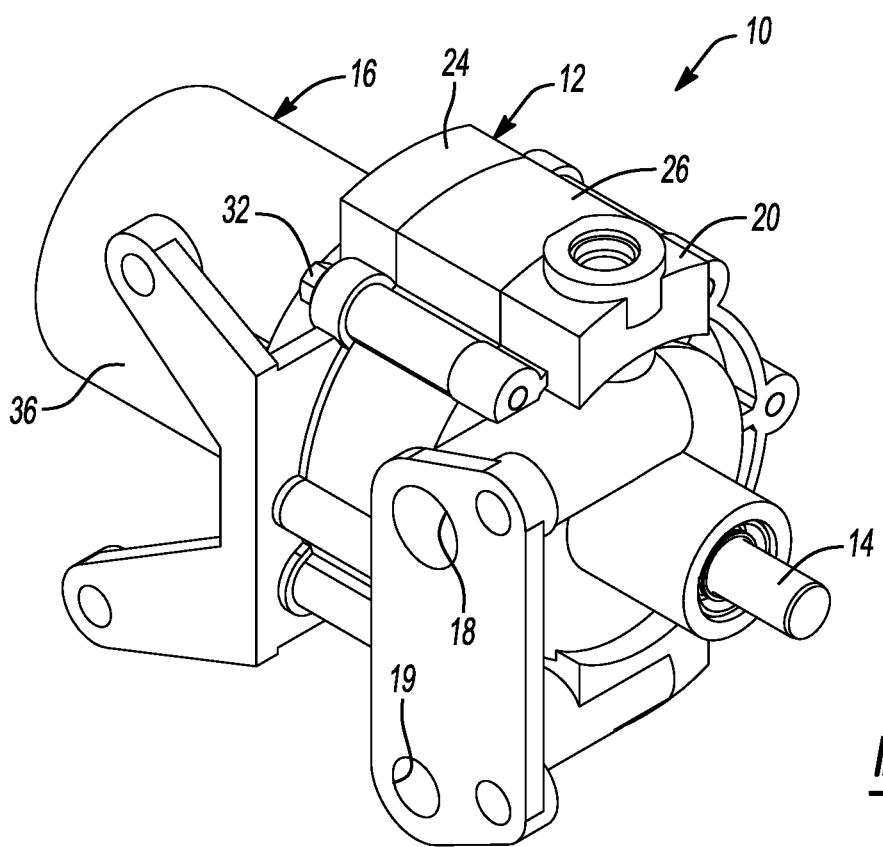
FIG. 2 is another perspective view of the pump depicted in FIG. 1.
Figure 3:
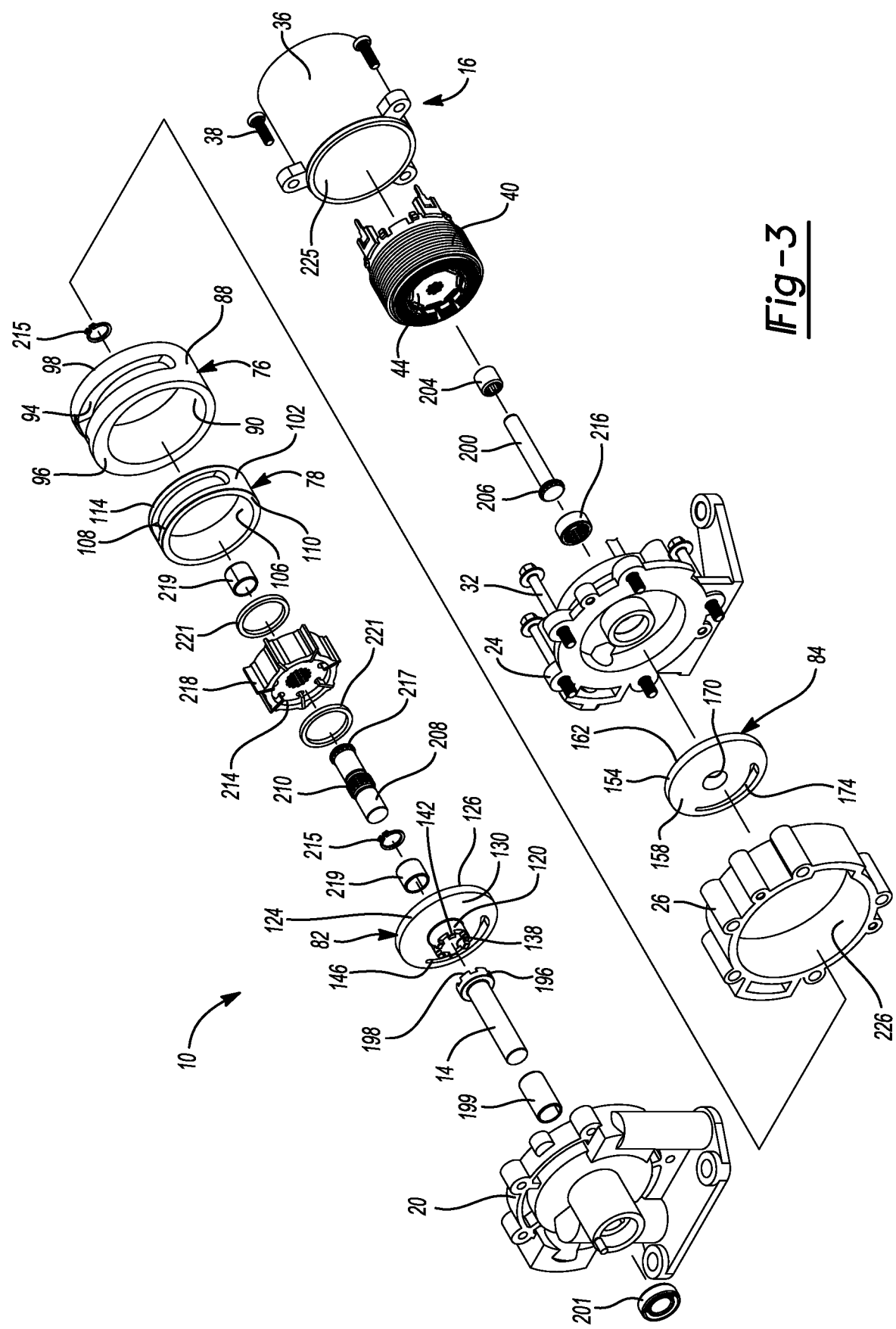
FIG. 3 is an exploded perspective view of the pump.
Figure 4:
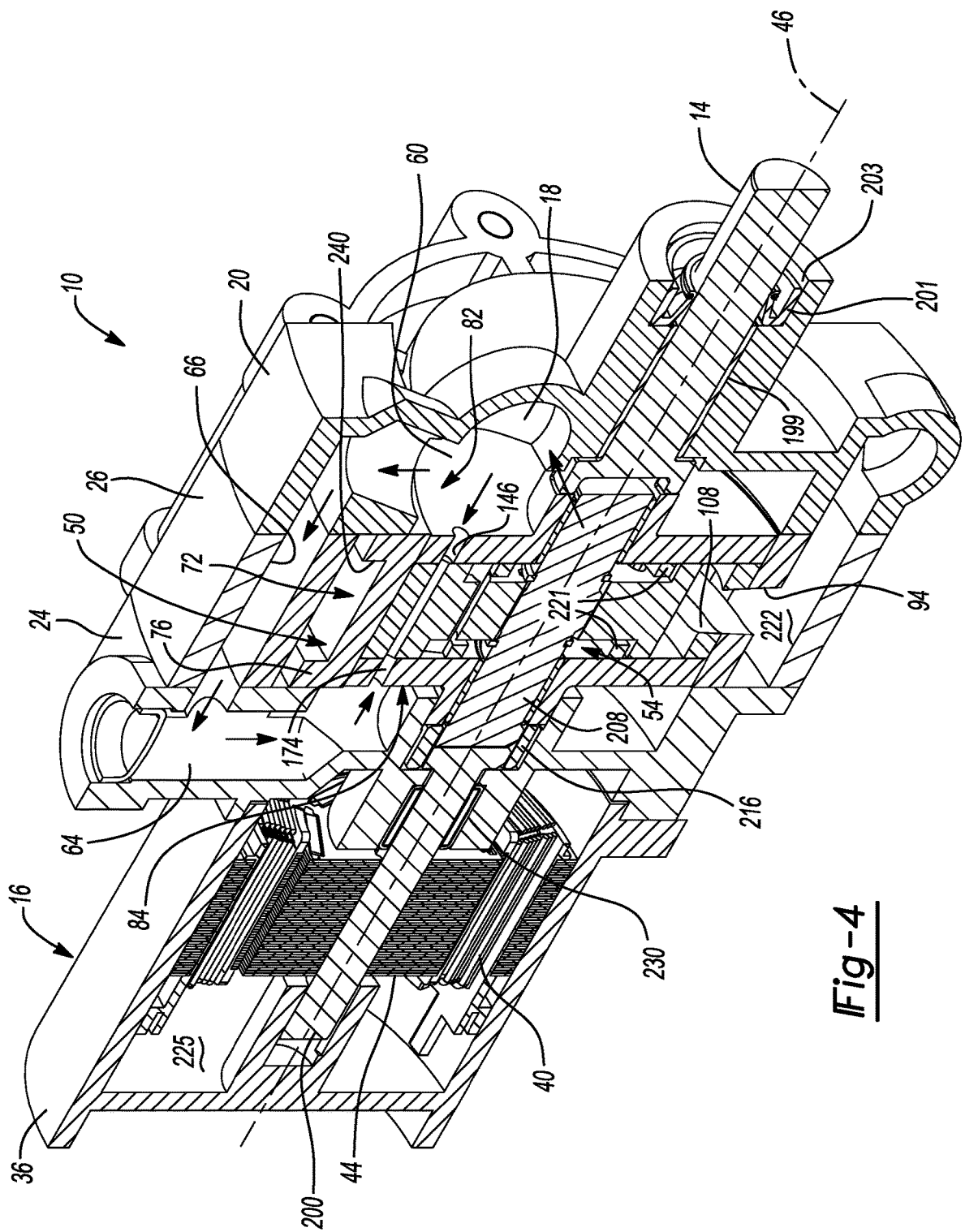
FIG. 4 is a fragmentary perspective view of the pump.
Figure 5:
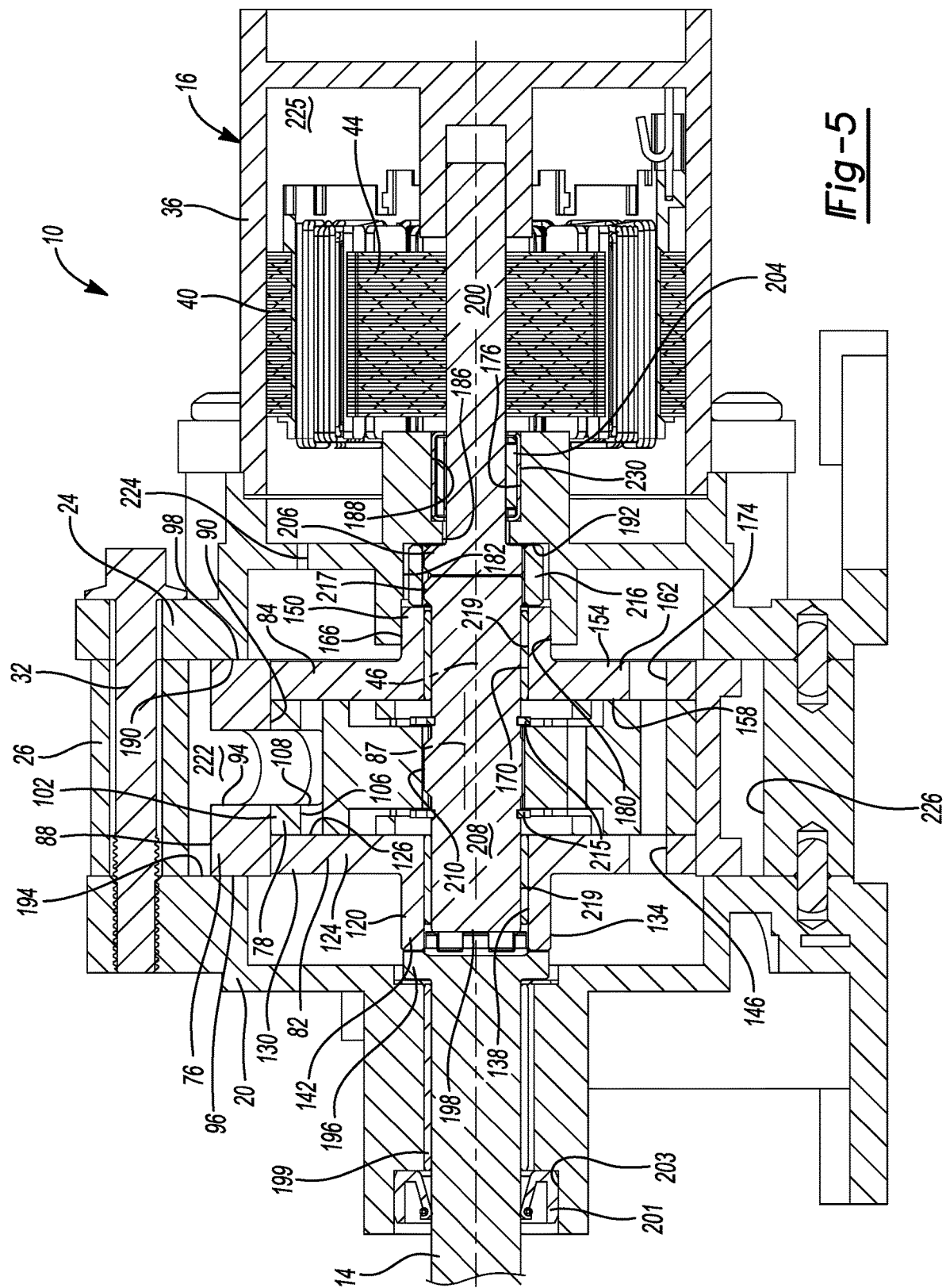
FIG. 5 is a cross-sectional view of the pump.
Figure 6:
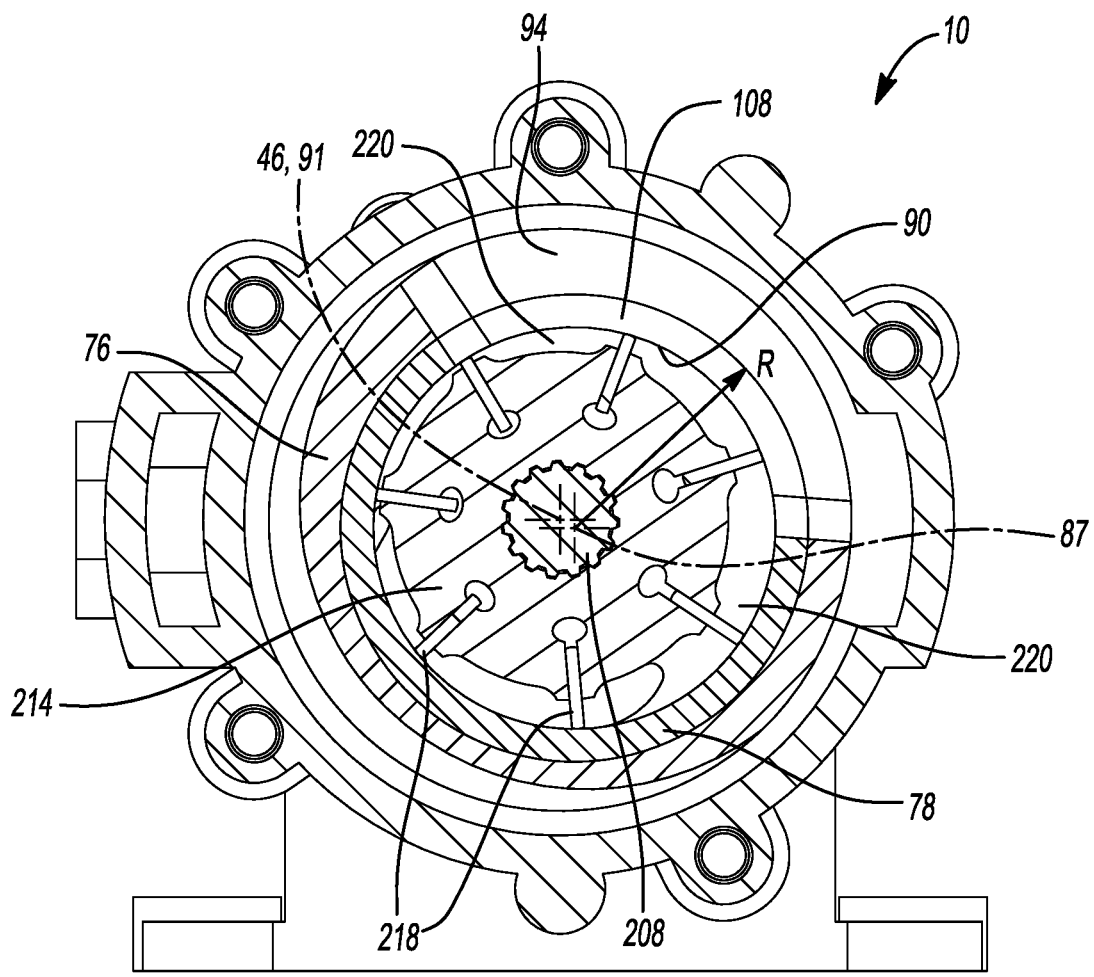
FIG. 6 is a cross-sectional view of the pump taken through the pumping chambers.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As depicted in the figures, a pump 10 includes a multi-piece housing 12 with an externally accessible input shaft 14 extending from one end and an electric motor 16 at an opposite end. Pump 10 is configured as a dual input vane pump that may be selectively driven by an external power source, not shown, such as an internal combustion engine. It is contemplated that the crankshaft or another driven member of the internal combustion engine is drivingly coupled to input shaft 14 via sprockets, belts or gear arrangement not depicted in the figures. Pump 10 may also be selectively driven by electric motor 16. As will be described in greater detail, either of the power sources individually, or both of the power sources concurrently, may be energized to operate pump 10.

Housing 12 includes an inlet 18 and an outlet 19. Housing 12 further includes a first end plate 20, a second end plate 24, and an intermediate plate 26. Threaded fasteners 32 interconnect first end plate 20, second end plate 24, and intermediate plate 26. Electric motor 16 includes a motor housing 36 fixed to second end plate 24 via fasteners 38.

Electric motor 16 includes a stator 40 fixedly mounted to housing 36 and restricted from rotation relative to housing 36. Electric motor 16 also includes a motor rotor 44 that is rotatably mounted relative to stator 40 and housing 12. Motor rotor 44 includes a plurality of magnets and is rotated about a central axis 46 upon electrical energization of stator 40.

Pump 10 includes a first subassembly 50 rotatably supported within housing 12 and driven by shaft 14. First subassembly 50 is rotatable about central axis 46. A second subassembly 54 is also rotatable about central axis 46 and positioned within housing 12. Second subassembly 54 is selectively rotated by electric motor 16. Relative rotation between first subassembly 50 and a second subassembly 54 causes a pumping action of fluid through pump 10.

Pump 10 includes a first inlet passage 60 and a second inlet passage 64 positioned in parallel with one another and on opposite sides of first subassembly 50. First end plate 20 includes first inlet passage 60 while second end plate 24 includes second inlet passage 64. A passageway 66 extends through intermediate plate 26 to place first inlet passage 60 in fluid communication with second inlet passage 64. As such, housing inlet 18 is in fluid communication with both first inlet passage 60 and a second inlet passage 64. Pump outlet 19 is provided on first end plate 20.

First subassembly 50 comprises a drum 72 including an outer ring 76, a cam ring 78, a first end cap 82 and a second end cap 84, each fixed for rotation with one another. Drum 72 rotates about central axis 46. Outer ring 76 includes a cylindrical outer surface 88 and an offset cylindrical inner surface 90. More particularly, a centerline 91 of outer cylindrical surface 88 and a centerline 87 of inner cylindrical surface 90 extend parallel and offset from one another to define a predetermined eccentricity. Centerline 87 is rotatable about central axis 46 while centerline 91 of outer cylindrical surface 88 maintains coaxial alignment with central axis 46. A slot 94 radially extends between outer cylindrical surface 88 and inner cylindrical surface 90 for a predetermined circumferentially extending arc length. Outer ring 76 includes a first end face 96 and an opposite and parallel second end face 98.

Cam ring 78 includes a cylindrical outer surface 102 as well as a cylindrical inner surface 106. Cylindrical outer surface 102 is coaxially aligned with cylindrical inner surface 106. A slot 108 extends through cam ring 78 from cylindrical outer surface 102 to cylindrical inner surface 106. Slot 108 circumferentially extends a predetermined amount. The arc length of slot 108 is substantially the same as the arc length of slot 94 to provide an outlet passageway therethrough. Cam ring 78 includes a first end face 110 that is spaced apart from and extends parallel to a second end face 114. Cylindrical outer surface 102 is sized to engage cylindrical inner surface 90 of outer ring 76 in a press fit engagement. As such, cam ring 78 and outer ring 76 rotate at the same speed.

First end cap 82 includes a trunnion portion 120 extending from a flange portion 124. Flange portion 124 includes an inner face 126 as well as an opposite and parallel outer face 130. Trunnion portion 120 includes an outer cylindrical surface 134 and an inner cylindrical bore 138. A plurality of circumferentially spaced apart teeth 142 are formed on a distal end of trunnion portion 120. A slot 146 extends through flange portion 124 from inner face 126 to outer face 130. Slot 146 circumferentially extends a predetermined arc length and has a particular pump gland teardrop shape. Second end cap 84 is similarly constructed including a trunnion portion 150 integrally formed with a flange portion 154. Flange portion 154 includes an inner face 158 and an opposite parallel outer face 162. Trunnion portion 150 includes an outer cylindrical surface 166. A cylindrical bore 170 extends through trunnion portion 150 and flange portion 154. A circumferentially extending slot 174 extends through flange portion 154 from inner face 158 to outer face 162. Slot 174 also has a teardrop shape to function as a pump gland.

Second end plate 24 includes a multi-stepped bore 176 including a first cylindrical surface 180, a second cylindrical surface 182 having a smaller diameter than first cylindrical surface 180, a third cylindrical surface 186, and a fourth cylindrical surface 188. An annular land 192 is positioned between the second cylindrical surface 182 and third cylindrical surface 186.

First cylindrical surface 180 is sized to support trunnion portion 150 for rotation relative to second end plate 24. Rotatable drum 72 is also guided by an end face 190 of second end plate 24 as well as an opposing end face 194 of first end plate 20.

If pump 10 is to be constructed as a relatively high pressure automatic transmission fluid pumping device, it may be desirable to accurately maintain a very small spacing between end face 190 of second end plate 24 and second end face 98 outer ring 76. Similarly, the running class fit between end face 194 of first end plate 20 and first end face 96 of outer ring 76 must be accurately controlled to assure proper pump function. In at least one embodiment of pump 10, it may be desirable to pump fluid at pressures up to 30 bar. Minimal clearances between the stationary pump housing 12 and the rotating drum 72 allow efficient operation of pump 10 at these relatively high pressures. To further assure desirable pump operation, intermediate plate 26 is constructed from the same material as outer ring 76. In the embodiment presently discussed, it is contemplated that outer ring 76 and intermediate plate 26 are constructed from steel, possibly a powdered metal steel. First end plate 20 and second end plate 24 are constructed from die-cast aluminum. Because intermediate plate 26 and outer ring 76 are constructed from the same material, these components exhibit the same coefficient of thermal expansion. Changes in dimension due to changes in operating temperature will be the same. As such, the aforementioned minimal running clearances will be maintained regardless of the operating temperature of pump 10. A double disc grinding operation may be performed to accurately define a width of outer ring 76 as well as the parallelism of first end face 96 relative to second end face 98. Dimensional tolerances within plus or minus three microns may be obtained using a double disc grinding operation.

Rotatable drum 72 is drivingly interconnected to input shaft 14. More particularly, input shaft 14 includes an enlarged end portion 196 including a plurality of circumferentially spaced apart teeth 198. Teeth 198 of input shaft 14 are drivingly engaged with teeth 142 of the first end cap 82. Input shaft 14 is supported for rotation within first end plate 20 by a bushing 199. A lip seal 201 is positioned within a counterbore 203 of first end plate 20 to restrict ingress of air within pump 10.

Second subassembly 54 is not only rotatable relative to housing 12 but also rotatable relative to first subassembly 50. Second subassembly 54 includes a motor shaft 200 fixed for rotation with motor rotor 44. Motor shaft 200 is supported for rotation by a needle bearing assembly 204 positioned within bore 176 and in engagement with fourth cylindrical surface 188. Motor shaft 200 includes an enlarged head portion 206 having an external spline.

Second subassembly 54 further includes a pump shaft 208 fixed for rotation with a pump rotor 214 via a splined interconnection. An external spline 210 engages an internal spline formed in pump rotor 214. Retaining rings 215 are positioned on opposite sides of external spline 210 to maintain a desired relative axial position between pump shaft 208 and pump rotor 214.

A coupling 216 includes an internal spline drivingly engaged with the external spline on head portion 206 and an external spline on a tail portion 217 of pump shaft 208 to drivingly connect pump shaft 208 with motor shaft 200. Bushings 219 rotatably support pump shaft 208 within drum 72.

A plurality of radially extending vanes 218 are slidably coupled to pump rotor 214 such that the vanes 218 rotate with pump rotor 214. Vanes 218 may radially translate relative to pump rotor 214 to account for the offset between the centerline of cam ring 78 and the drum axis of rotation 46. Pump rotor 214 rotates about central axis 46. Vane rings 221 are positioned on opposite sides of and adjacent to pump rotor 214 to maintain engagement between the distal ends of vanes 218 with cylindrical inner surface 106 of cam ring 78. The vane rings 221 function to prevent vanes 218 from sliding inwards, so that the distal ends of vanes 218 remain in contact with cam ring 78. On the pump outlet side, high pressure acts on the distal ends of vanes 218 which urges them inward. A central space near the centerline of pump rotor 214 is at low pressure. Therefore, without vane rings 221, nothing would restrict vanes 218 from sliding inward.

One skilled in the art should appreciate that the decision to use three separate components such as input shaft 14, pump shaft 208, and motor shaft 200 is driven by the very close running class fit desired between drum 72 and housing 12. The tolerances on the components of the drum and the associated housing surfaces are so small that tolerances pertaining to the shafts 14, 200, 208 must be enlarged to allow assembly and proper pump operation. For example, the splined interconnection between motor shaft 200 and pump shaft 208 via coupling 216 allows for relative misalignment between an axis of rotation of motor shaft 200 and an axis of rotation of pump shaft 208. Similarly, an axis of rotation of input shaft 14 may be slightly misaligned with the axis of rotation of pump shaft 208 based on the gear tooth interface.

It is contemplated that an alternate embodiment may be constructed incorporating a singular motor and vane shaft such that elements 200 and 208 would be integrally formed with another as one piece. Similarly, input shaft 14 may be integrally formed with first end cap 82 in a simplified, more dimensionally tolerant design. Such a design may be useful for applications requiring lower pressure outputs in the range of three to four bar.

During operation, relative rotation between vanes 218 and cam ring 78 cause fluid to be drawn into housing inlet 18, first inlet passage 60 and second inlet passage 64. Low-pressure fluid is positioned on opposite sides of drum 72 in simultaneous communication with outer face 130 and slot 146 as well as outer face 162 and slot 174. Low pressure fluid enters pumping cavities 220 in an axial direction through slots 146, 174. High pressure fluid exits pumping cavities 220 in a radial direction. In particular, slot 108 of cam ring 78 is in fluid communication with pumping cavities 220 when the pressure is high. Slot 94 of outer ring 76 is aligned with and in fluid communication with slot 108 of cam ring 78. A high pressure cavity 222 is defined by an inner cylindrical surface 226 intermediate plate 26, end face 190, end face 194 and outer cylindrical surface 88 of outer ring 76. Slot 108 and slot 94 are in fluid communication with high pressure cavity 222. Outlet 19 is in fluid communication with high pressure cavity 222. Taking the previously described geometry into account, the forces acting on drum 72 are axially and radially balanced. Special bearings or axial load reaction arrangements are not required for the present design.

To assure pump capability providing the relatively high 30 bar output previously described, a width of cam ring 78 is machined using double disc grinding operations. The distance between first end face 110 and second end face 114 is defined to be very slightly greater than the width of vanes 218 and rotor 214 to minimize any leak paths between high pressure cavity 222 and the remaining low pressure zones within pump 10. In particular, it is contemplated that clearances between vanes 218 and rotor 214, and first and second end caps 82, 84 provide an opportunity for high pressure fluid to leak past the vanes thereby reducing pump maximum pressure capacity. Similarly, the clearances between outer ring 76 and first and second end plates 20, 24 provide additional possible leak paths. As previously stated, if the particular embodiment of pump to be manufactured need only output relatively low pressure fluid, tolerances associated with these components and the clearances between the relatively moving components may be relaxed to reduce costs and complexity.

Pump 10 includes a low pressure fluid path 224 connecting a motor cavity 225 with second inlet passage 64. Another low-pressure fluid path 227 includes a gap between third cylindrical surface 186 and motor shaft 200 as well as a path through bearings 204 or one-way clutch 230. These fluid passageways assure a low-pressure fluid presence at bushings or bearings 219.

In a first mode of operation, input torque may be provided to input shaft 14 via an internal combustion engine. In the first mode of operation, pump shaft 208 is restricted from rotation. Accordingly, pump rotor 214 and vanes 218 are restricted from rotation relative to housing 12. Rotation of input shaft 14 drives drum 72 such that cam ring 78 and outer ring 76 rotate relative to pump rotor 214. A magnitude of pump output is proportional to the rotational speed of input shaft 14.

In a second mode of operation, input torque is provided to motor shaft 200 via electric motor 16. Input shaft 14 is restricted from rotation in the second mode of operation. Motor shaft 200 drives pump shaft 208 which in turn rotates pump rotor 214 and vanes 218. Because input shaft 14 is restricted from rotation, drum 72 is also restricted from rotation. Accordingly, relative rotation occurs between cam ring 78 and vanes 218. The magnitude of pump output is proportional to the rotational speed of motor shaft 200.

In a third mode of operation, input torque is provided to input shaft 14 to rotate input shaft 14 in a first direction. Motor shaft 200 is driven in an opposite rotation by electric motor 16. The magnitude of pump output is based on the relative rotational speed between cam ring 78 and pump rotor 214. To assure opposite rotation or at least relative rotation between drum 72 and vane pump rotor 214, it may be beneficial to include a one-way clutch 230 to restrict the rotation direction of motor shaft 200 relative to housing 12. In the figures, bearing 204 may be configured as one-way clutch 230.

Based on the various operating modes available, additional considerations are taken into account to provide a robust, low-cost pump. In addition, drum 72 may include a special configuration to closely align a center of gravity of drum 72 to its axis of rotation. An external cutout or groove 240 removes mass from a portion of outer ring 76 to minimize rotational imbalance of the rotating first subassembly 50.

The invention claimed is:

1. A fluid pumping system for a vehicle having an internal combustion engine, the fluid pumping system comprising:
   a housing;
   an electric motor;
   a rotatable first input adapted to be driven by the internal combustion engine;
   a rotatable second input driven by the electric motor; and
   a pump including a drum selectively rotated about a drum axis of rotation by one of the first input and the second input, and a pump rotor selectively rotated by the other of the first input and the second input, wherein the drum includes a cam ring having a cavity in receipt of the pump rotor, the drum including a first fluid inlet port and a second fluid inlet port on opposite sides of the drum, wherein fluid entering the cavity through the first and second fluid ports flows axially in a direction parallel to the drum axis of rotation, the drum including a radially extending outlet port, wherein pumped fluid flows radially out of the cavity, the housing containing the electric motor and the pump.

2. The fluid pumping system of claim 1, wherein the housing and the drum define a high pressure cavity circumferentially surrounding the drum, the high pressure cavity being in fluid communication with the outlet port.

3. The fluid pumping system of claim 1, further including a one-way clutch restricting rotation of the second input to a single direction of rotation.

4. The fluid pumping system of claim 1, wherein the housing includes a first inlet passage and a second inlet passage, the first and second inlet passages extending parallel to one another on opposite sides of the drum.

5. The fluid pumping system of claim 1, wherein the drum includes an outer ring, the cam ring, a first end cap and an opposite second end cap fixed for rotation with each other, wherein the first end cap includes the first fluid inlet port and the second end cap includes the second fluid inlet port.

6. The fluid pumping system of claim 1, further including a pump rotor shaft fixed for rotation with the pump rotor, wherein the pump rotor shaft is drivingly engaged with the second input.

7. The fluid pumping system of claim 1, wherein the fluid pumping system is operable in a first mode wherein the first input rotates and the second input is stationary, in a second mode wherein the first input is stationary and the second input rotates, and a third mode wherein the first input rotates in a first direction and the second input simultaneously rotates in an opposite direction.

8. The fluid pumping system of claim 1, wherein the first input includes an input shaft extending through the housing, the input shaft having one end in driving engagement with the drum.

9. The fluid pumping system of claim 1, wherein the electric motor is submerged within a fluid to be pumped.

10. The fluid pumping system of claim 1, wherein the cavity of the cam ring includes a centerline rotatable about the axis of rotation of the drum.

11. The fluid pumping system of claim 1, wherein the electric motor is adapted to rotate one of the drum and the pump rotor in a first direction and internal combustion engine is adapted to rotate the other of the drum and the pump rotor in the opposite direction.

12. The fluid pumping system of claim 1, wherein the cam ring includes a wall with an internal cylindrical bore at least partially defining the cavity, the cam ring including an outlet passageway radially extending through the wall.

13. A fluid pumping system for a vehicle having an internal combustion engine, the fluid pumping system comprising:
- a housing;
- an electric motor;
- a rotatable first input driven by the internal combustion engine;
- a rotatable second input driven by the electric motor; and
- a vane pump including a rotatable cam ring having a cylindrical cavity, a rotatable pump rotor, and circumferentially spaced apart vanes, the vanes and the pump rotor being fixed for rotation with one another and being positioned with the cylindrical cavity, wherein the cam ring is drivingly coupled to one of the electric motor and the internal combustion engine, the pump rotor being drivingly coupled to the other of the electric motor and the internal combustion engine, wherein the cam ring is supported for rotation within the housing.

14. The fluid pumping system of claim 13, wherein an axis of a cylindrical cavity of the cam ring rotates about an axis of rotation of the first input.

15. The fluid pumping system of claim 13, wherein the fluid pumping system is operable in a first mode when the first input rotates and the second input is stationary, a second mode when the first input is stationary and the second input rotates, and a third mode when the first input rotates in a first direction and the second input simultaneously rotates in an opposite direction.

16. The fluid pumping system of claim 13, further including a one-way clutch restricting rotation of the second input to a single direction of rotation.

17. The fluid pumping system of claim 13, wherein the housing includes a first inlet passage and a second inlet passage, the first and second inlet passages extending parallel to one another on opposite sides of the cam ring.

* * * * *